United States Patent [19]

Alfonso

[11] Patent Number: 4,779,920
[45] Date of Patent: Oct. 25, 1988

[54] UNIVERSAL TILTABLE AND SLIDABLE SUNROOF FOR MOTOR VEHICLES

[75] Inventor: Lelio Alfonso, Turin, Italy

[73] Assignee: Vallko, s.r.l., Turin, Italy

[21] Appl. No.: 147,607

[22] Filed: Jan. 22, 1988

Related U.S. Application Data

[63] Continuation of Ser. No. 798,410, Nov. 15, 1985, abandoned.

[30] Foreign Application Priority Data

Nov. 16, 1984 [IT] Italy .............................. 68147 A/84

[51] Int. Cl.⁴ ........................... B60J 7/05; B60J 7/19
[52] U.S. Cl. .................................. 296/221; 296/222; 296/224
[58] Field of Search ................... 296/216, 220–224

[56] References Cited

U.S. PATENT DOCUMENTS 4,364,601 12/1982 Katayama et al. ............... 296/221
4,407,541 10/1983 Boots ............................... 296/216

FOREIGN PATENT DOCUMENTS 2114212 8/1983 United Kingdom ............... 296/222

Primary Examiner—Dennis H. Pedder
Attorney, Agent, or Firm—Birch, Stewart, Kolasch & Birch

[57] ABSTRACT

A universal tiltable and slidable sunroof apparatus for motor vehicles having a first guide shoe driven slidably within a channel by a bowden cable and a second guide shoe restrained from sliding within the channel by a first lock mechanism while the first guide shoe traverses a first section of the channel whereby the sunroof tilts open. After the first guide shoe traverses the first section of channel, the first lock is released by a first release mechanism and a second lock mechanism releasably connects the first guide shoe and the second guide shoe together with both guide shoes being driven along a second section of the channel whereby the sunroof traverses a predetermined distance. A second release mechanism disconnects the first guide shoe from the second guide shoe at a position along the channel upon closing the sunroof.

11 Claims, 4 Drawing Sheets

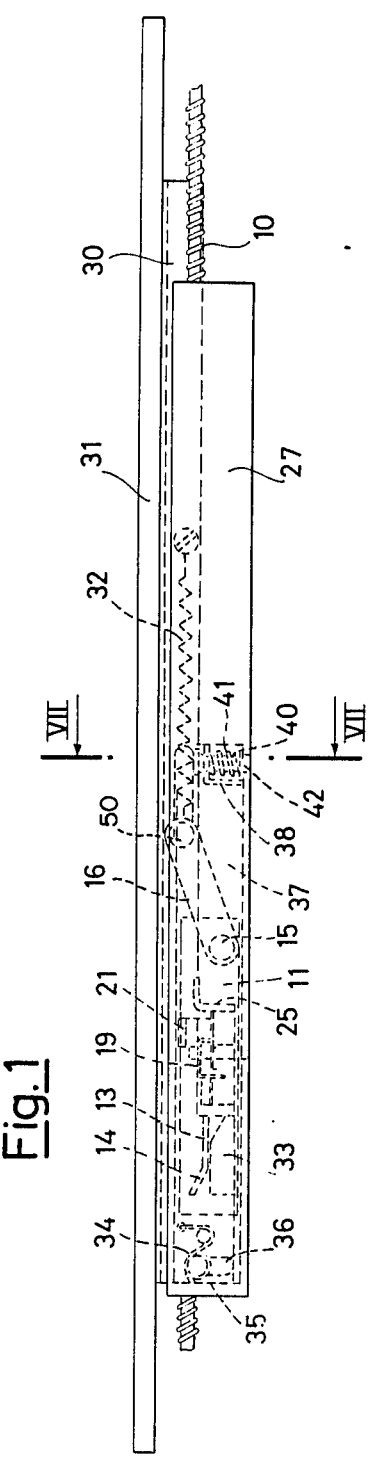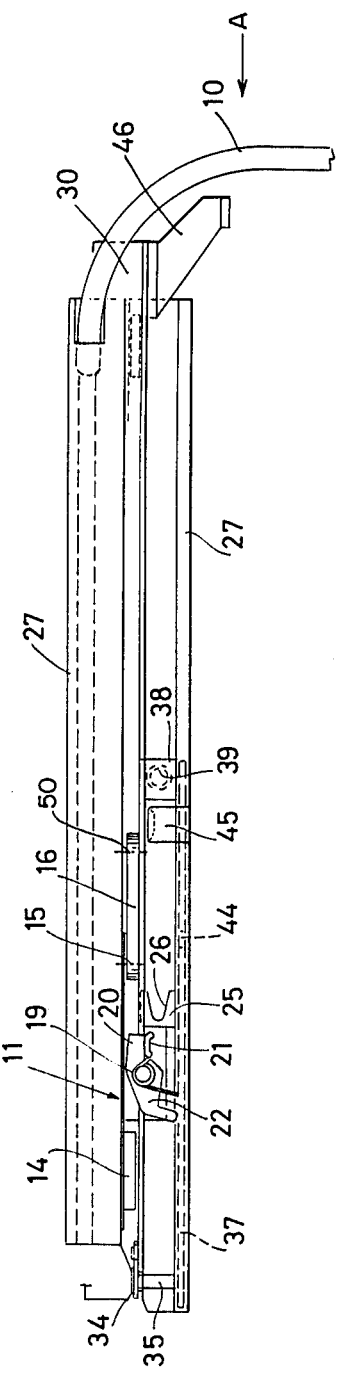

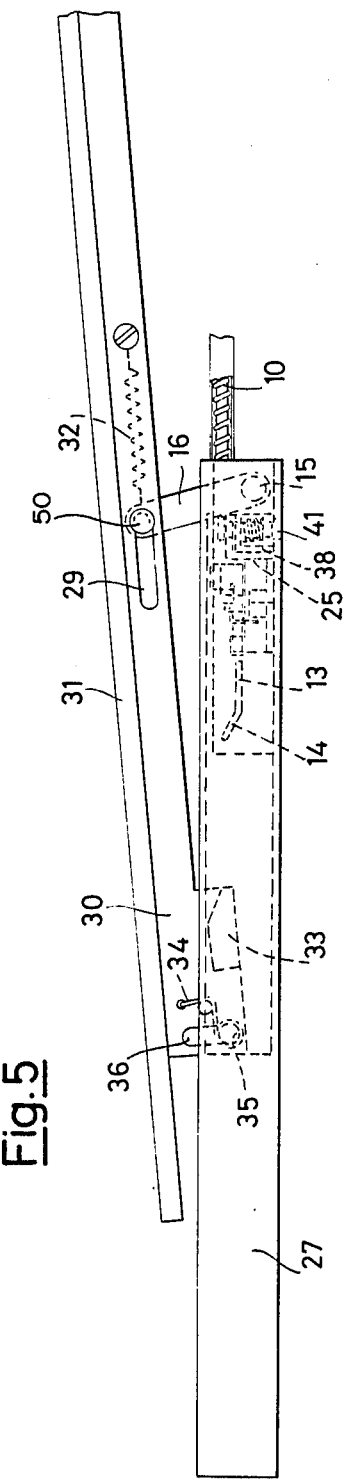
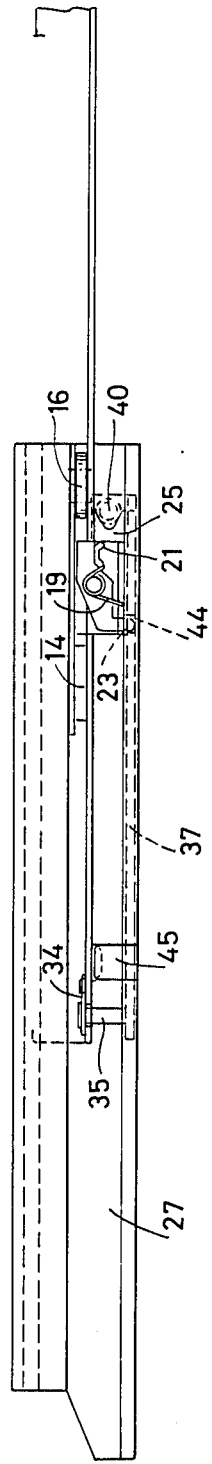
Fig.5
Fig.6

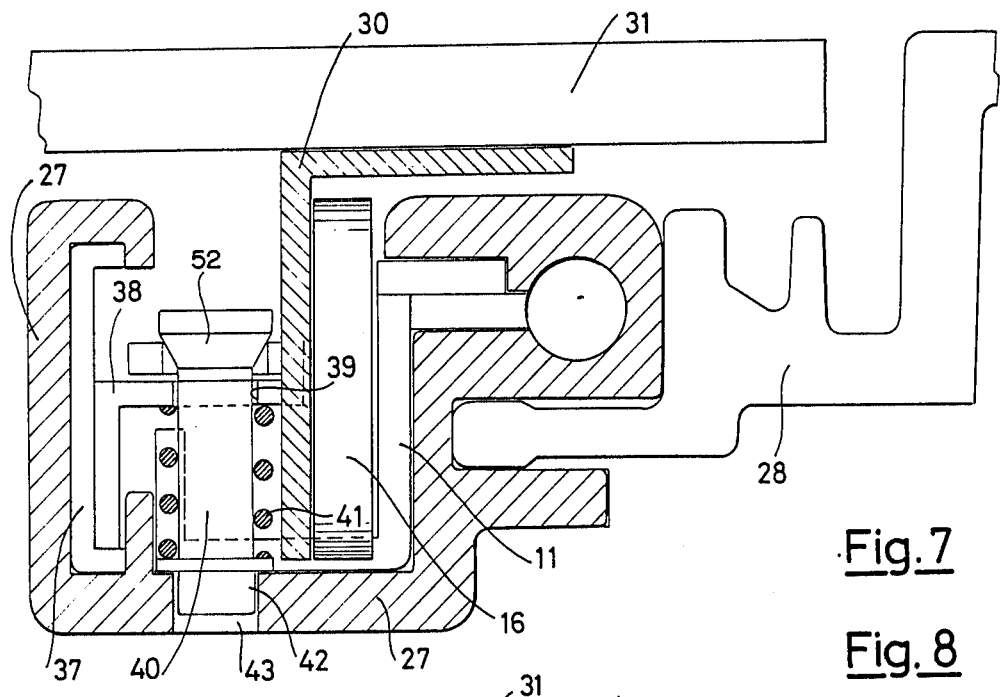
Fig. 7
Fig. 8
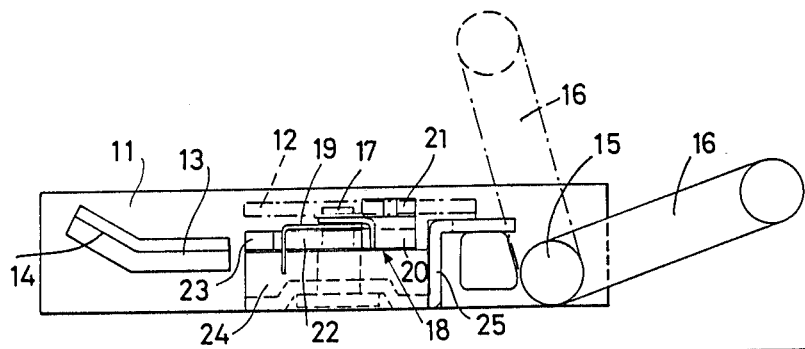
Fig. 9
Fig. 10

UNIVERSAL TILTABLE AND SLIDABLE SUNROOF FOR MOTOR VEHICLES

This application is a continuation of application Ser. No. 798,410 filed on Nov. 15, 1985, abandoned.

BACKGROUND OF THE INVENTION

The invention relates to a universal tiltable and slidable sunroof for motor vehicles.

Most of the motor vehicle sunroofs which can be found on the market today are of a type which is either simply tiltable or slidable with simultaneous tilting movement, and this is due to the fact that it is not easy to obtain the two distinct functions without having to make recourse to particularly sophisticated and complex mechanisms.

Some of the conventional sunroofs intended to be used in the assembly of new motor vehicles provide these distinct double functions. However, the new motor vehicle manufacturers are facilitated in this task by the fact that such sunroofs are mounted in special spaces provided in the roof in the motor car, thus providing sunroofs especially designed and planned for a predetermined type of vehicle. Also, manufacturers adopt certain fixed dimensions for their various models to facilitate their production range.

On the contrary, the subject matter of the present invention is a universal sunroof (i.e. a sunroof of the type which may be mounted as an accessory on any type of motor car). Therefore, the sunroof of the present invention is provided with mechanisms for providing tilting and translation, which mechanisms are particularly compact and at the same time reliable for any type of motor car.

The sunroof according to the invention has also the great advantage in that it allows a perfect perimetrical seal of the sunroof when closed, which in many universal sunroofs which can be found on the market today, is not present even with the sunroofs which are tiltable or slidable.

SUMMARY OF THE INVENTION

An object of the present invention is to provide a universal tiltable and slidable sunroof for vehicles, characterized in that it is hinged at its front side to a front guide shoe slidable longitudinally along fixed guides positioned adjacent to a contoured opening in the roof of the vehicle. The sunroof is articulated by a lever pivotably connected to a rear guide shoe also slidable along the guides under the action of a flexible cable controlled by means of a hand grip or a geared motor. Locking means is provided for locking the front guide shoe to the guides during a first section of translation of the rear guide shoe, with a consequent initial tilting movement of the sunroof about the hinge connection with the front guide shoe by means of a lever. Automatic release members are provided for releasing said locking means at the end of said initial tilting stage. Further, means are provided to connect the two guide shoes together and to provide sliding movement of the sunroof during a second section of translation of the rear guide shoe. Furthermore, members are provided for the automatic disengagement of the two guide shoes at the end of the first return stage of the rear guide shoe. The members act simultaneously with the repositioning of the locking means of the front guide shoe and allow the closure of the sunroof during a second return stage of the rear guide shoe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 1 is a side view of the sunroof of the present invention in a closed position;

FIG. 2 is a partial top view of the sunroof shown in FIG. 1;

FIG. 5 is a side view of the sunroof of the present invention in a translated open position;

FIG. 6 is a partial top view of the sunroof shown in FIG. 5;

FIG. 7 is a cross-sectional view along the line VII—VII of FIG. 1;

FIG. 8 is an end view of the detail as seen along arrow A in FIG. 2;

FIG. 9 is a detailed side view of the rear (first) guide shoe;

FIG. 10 is a top view showing the details of the rear (first) guide shoe.

Figure 3:
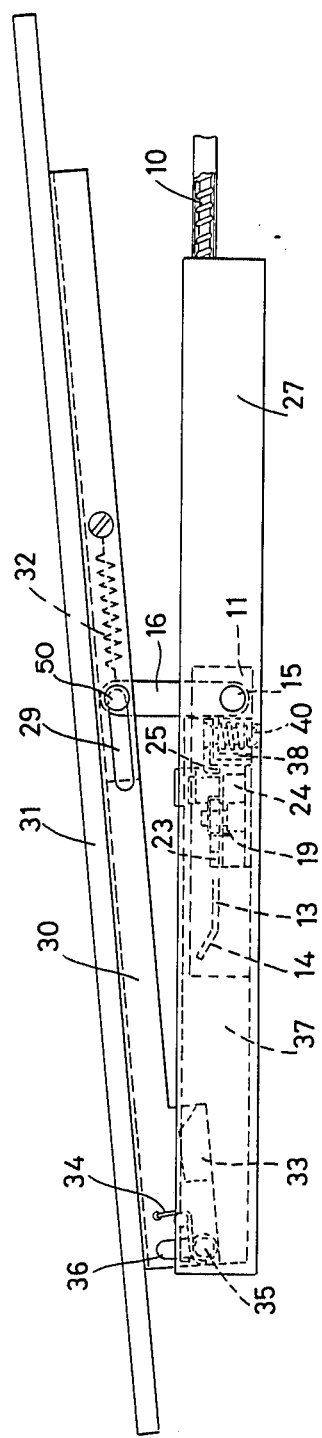
FIG. 3 is a side view of the sunroof of the present invention in a pivoted open position.

DETAILED DESCRIPTION OF PREFERRED EMBODIMENTS:

Connected in a know manner to a rotary hand grip or to a geared motor (not shown) of the sunroof is a bowden or threaded flexible cable indicated by reference numeral 10 as shown in FIGS. 1, 3, 5, and 8. Rigidly connected along the cable 10 is bushing 12 of a first guide shoe 11, more clearly shown in FIGS. 9 and 10. Provided on an end of the guide shoe 11 is a bracket 13 provided with an inclined surface 14 with a lever 16 hingedly connected at 15 to the other end.

Provided on the first guide shoe 11 is a bracket 24 to which there is hinged at 18 a prawl 18 biased by a spring 19 into the position shown in FIG. 10 in which an arm 20 of the prawl 18 abuts against the guide shoe 11. Supported on the end of the arm 20 is a substantially C-shaped protrusion 21 provided for a purpose which will be explained hereinbelow. Extending in a direction opposite to the arm 20 relative to the hinging point, the prawl 18 includes a second arm 22 whose end 23 is orthogonal to the direction of translation of the guide shoe 11. Extending sideways from the bracket 24 is a section iron 25 provided with V-shaped grooves 26 as shown in FIG. 10. As shown in FIG. 7, the first guide shoe 11 is slidable within a fixed section iron 27 which in turn is rigidly connected to the frame 28 defining a space provided in the roof of the motor vehicle for accomodating the sunroof.

The lever 16 (FIGS. 1, 3, and 5) is slidably hinged by means of a pin 50 disposed in a slot 29 of a bracket 30 with which the sunroof 31 is supported. Between the bracket 30 and the lever 16 there is inserted a spring 32 which biases the lever 16 to the position shown in FIGS. 3 and 5, within the slot 29. At the other end of the bracket 30 there is a wedge 33 intended to cooperate with the bracket 13 of the guide shoe, as will be discussed below. There is also provided a spring 34, one end of which exerts a force onto a pin 35 on which a slot 36 of the bracket 30 slides.

Pin 35 is rigidly connected to a second (front) guide shoe 37 which guides the sunroof 31. As can be seen in FIG. 7, this second guide shoe slides between the sidewalls of the section iron 27 and supports, at the end opposite the pin 35, a shaped section iron 38 (FIG. 7). The shaped section iron 38 is provided with a hole 39 having inserted therein a pin 40 having a beveled head 52 maintained in the rest position shown in FIG. 7 by a spring 41 which biases the end 42 thereof into a corresponding hole 43 in the section iron 27.

Formed in the guide shoe 37 is also a hole 44 arranged to cooperate, as will be discussed below, with the head 23 of the pawl 18. In the section iron 27 there is provided a plate 45 arranged to cooperate with the C-shaped protrusion 21 of pawl 18. As shown in FIGS. 2 and 8, adjacent the opening in the vehicle there is also connected to bracket 30 a section iron 46 which cooperates with a bushing 47 securely connected to the cable 10 and provided with an inclined plane 48.

FIGS. 1 and 2 illustrate the closed position of the roof 31 in which good sealing is ensured along the perimetrical sealing gasket due to the wedge 33 being edges under the bracket 13 while the wedge 48 is wedged above iron section 46 and accordingly the roof 31 is pressed towards the passenger compartment into sealing engagement with the premetrical gasket (not shown).

Figure 4:
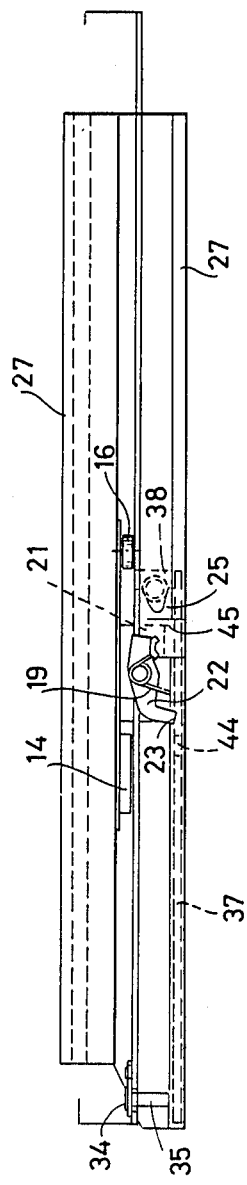
FIG. 4 is a partial top view of the sunroof shown in FIG. 3.

By operating the handle or the geared motor mentioned above for opening the sunroof, which in turn rotates the cable 10, bushing 47 is translated to the left in FIG. 8 disengaging the section iron 46, while the guide shoe 11 is translated to the right in FIGS. 1, 2 (i.e. to the position shown in FIGS. 3 and 4). Consequently, the bracket 13 disengages with the wedge 33. Under this operational condition, the roof 31 is slightly lifted off the perimetrical gasket so as to no longer exert pressure thereon, due to the action of spring 34. After the wedges are released, the spring 34 biases the braket 30 to slide in a vertical direction by the pin 35 sliding in slot 36, thus lifting the sunroof 31 from the top of the motor car. At the same time, by translating the guide shoe 11 the lever 16 is actuated from the position shown in FIG. 1 to the position shown in FIG. 3 (i.e. it rotates and slides along the slot 29, biased by the spring 32, so that the sunroof 31 tilts about the pin 35 into the opened position).

The sunroof 31 cannot slide during the rotation of the lever 16 because the end 42 of the pin 40 is driven into the hole 43 of the fixed section iron 27 and accordingly the second guide shoe 37 which guides the sunroof 31, by means of pin 35, is locked. After having terminated the operation of opening the sunroof 31, if one continues the rotation of the handle or of the geared motor, the first guide shoe 11 continues its stroke and the plate 25, rigidly connected thereto, wedges in under the beveled head 52 of the pin 40, thereby lifting it against the action of the spring 41, and thus withdrawing it from the hole 43. The second guide shoe 37 is then allowed to translate within the fixed section iron 27. At the same time, the tooth 23 of the pawl 18 meets the cavity 44 of the second guide shoe 37 and thereby rigidly connects the guide shoes 11 and 37 to one another. In this way, there is obtained a translation of the sunroof 31 together with the guide shoe 11 up to the position shown in FIG. 5 in which the sunroof 31 is not only rotated outwards away from the roof of the vehicle, but also translated rearwardly, thus providing the desired two types of opening modes.

During the stage of closure of the sunroof 31, the handle or geared motor is operated in a reverse direction with respect to the stage of opening the sunroof. The sunroof is translated into the position shown in FIG. 3 during an initial closing stage, since the second guide shoe 37 and the first guide shoe 11 are still rigidly connected to one another and the guide shoe is translated forwardly by the cable 10. At the end of the sliding movement (FIG. 3), the C-shaped protrusion 21 of the pawl 18 engages with fixed bracket 45. Against the action of the spring 19, the prawl 18 rotates and its tooth 23 comes out from the cavity 44 in the guide shoe 11. The plate 25 becomes disengaged from the pin 40 which then is biased by spring 41 into the hole 43 of the section iron 27 rigidly connecting again the second guide shoe 37 to the fixed frame.

Thus, the position shown in FIG. 3 is restored again, in which the guide shoe 37 is fixed and the roof 31 can be tilted only. When further translating the first guide shoe 11 forwardly, lever 16 is rotated resulting in the roof 31 being lowered.

After this stage, a stroke of about 20 mm is continued, during which the position of the lever 16 is not varied, since the lever 16 slides within the slot 28. During the final stroke, the locking wedges 48 and 14 slide on the respective inclined surfaces planes 46 and 33, thus giving rise to the further lowering of the sunroof onto the sealing gasket with such a pressure as to ensure a waterproof sealing condition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tiltable and slidable sunroof apparatus for a motor vehicle comprising:

a sunroof;

an elongated bracket supporting said sunroof;

a channel including means for attaching said channel to an edge of an opening in the roof of the motor vehicle;

a first guide shoe slidably received within said channel;

a second guide shoe slidably received within said channel, said elongated bracket being pivotally mounted to said second guide shoe, said first guide shoe being independently slidable with respect to said second guide shoe through a portion of its length of travel;

a lever pivotally mounted to and connecting said first guide shoe and said elongated bracket;

drive means for translating said first guide shoe along the length of said channel for opening and closing said sunroof;

lock-release means for preventing movement of said second guide shoe during translation of said first guide shoe along a first section of said channel for providing tilting of the sunroof; and latching means for releasably connecting said first guide shoe and said second guide shoe together during translation of both said first guide shoe and said second guide shoe along a second section of said channel for providing translation of the sunroof.

2. The apparatus according to claim 1, wherein said elongated bracket includes a first wedge and said first guide shoe includes a bracket provided with a first inclined surface and wherein said apparatus further includes a second wedge having a second inclined surface cooperating with said drive means whereby said first inclined surface of said first guide shoe engages with said first wedge of said elongated bracket and said second inclined surface of said second wedge engages with an extension of said elongated bracket during a closing operation of said sunroof for tightly sealing the sunroof to said channel.

3. The apparatus according to claim 2, wherein said elongated bracket includes a substantially vertically disposed slot at the position where said elongated bracket is pivotally connected to said second guide shoe, wherein said second guide shoe includes a pin extending from said second guide shoe and riding within said substantially vertically disposed slot in said elongated bracket, and wherein said apparatus includes a spring for biasing said elongated bracket upwardly resulting in movement of said first pin within said substantially vertically disposed slot upon said first wedge of said elongated bracket being disengaged with said sloping surface of said bracket of said first guide shoe.

4. The apparatus according to claim 3, wherein said elongated bracket includes a substantially horizontal disposed slot at a position where said elongated bracket is pivotally connected to said lever, wherein said lever includes a pin extending from one end of said lever and riding within said substantially horizontally disposed slot, and wherein said apparatus includes a spring for biasing said pin extending from said lever within said substantially horizontally disposed slot in a direction away from said pin extending from said second guide shoe.

5. The apparatus according the claim 1, wherein said lock-release means comprises a first locking means for locking said second guide shoe to said channel during a translation of said first guide shoe along said first section of said channel, with a consequent tilting movement of the sunroof; and a first release means for releasing said first locking means at the end of said initial tilting stage; and wherein said latching means comprises a second locking means for releasably connecting said first guide shoe to said second guide shoe for providing sliding of the sunroof during translation of both said first guide shoe and said second guide shoe along the second section of said channel; and a second release means for releasing said second locking means for disengaging said first guide shoe from said second guide shoe during translation of said first guide shoe during a return stage of said first guide shoe during a closing operation of said sunroof.

6. The apparatus according to claims 5, wherein said first locking means comprises a spring biased pin having a beveled head extending from said second guide shoe for engaging with a hole in said channel.

7. The apparatus according to claim 6, wherein said first release means comprises a plate having a V-shaped groove extending from said first guide shoe for engaging with said beveled head of said spring biased pin for releasing said spring biased pin from said hole in said channel.

8. The apparatus according to claim 5, wherein said second locking means comprises a spring biased, pawl pivotally mounted to a bracket extending from first shoe guide, said pawl having a first arm for engaging with a hole in said second guide shoe, said pawl having a second arm.

9. The apparatus according to claim 8, wherein said second release means comprises a plate extending from said channel for engaging with the second arm of said pawl for releasing said first arm of said pawl from said hole in said second guide shoe.

10. The apparatus according to claim 5, wherein said drive means is a threaded flexible cable that can be driven by a remote drive.

11. A tiltable and slidable sunroof apparatus comprising:

a sunroof;

an elongated bracket connected to and supporting said sunroof, said elongated bracket having a substantially horizontally disposed slot and a substantially vertically disposed slot whereby said substantially horizontally disposed slot is separated by a predetermined distance from said substantially vertically disposed slot along the length of said elongated bracket;

a channel having means for attaching said channel to a roof frame of a motor vehicle;

a first guide shoe slidably received within said channel;

a second guide shoe slidably received within said channel and a first pin extending from said second guide shoe, said first pin pivotally connecting said second guide shoe to said elongated bracket whereby said first pin rides within said substantially vertically disposed slot of said elongated member;

a lever having a first end pivotally mounted to said first guide shoe and having a second pin extending from a second end of said lever, said second pin pivotally connecting said lever to said elongated bracket whereby said second pin rides within said substantially horizontally disposed slot of said elongated member;

a first spring for biasing said elongated bracket vertically with respect to said channel;

a second spring for biasing said lever in a direction away from said first pin;

drive means for translating said first guide shoe along the length of said channel for opening and closing said sunroof.

* * * * *